(12) United States Patent
Asakawa et al.

(10) Patent No.: US 10,226,847 B2
(45) Date of Patent: Mar. 12, 2019

(54) MACHINING SYSTEM (71) Applicant: FUJI MACHINE MFG. CO., LTD., Chiryu (JP)

(72) Inventors: Kazuya Asakawa, Toyota (JP); Kenji Mizuta, Kasugai (JP); Shigefumi Suzuyama, Toyota (JP)

(73) Assignee: FUJI CORPORATION, Chiryu (JP)

(*) Notice: Subject to any disclaimer, the term of this patent is extended or adjusted under 35 U.S.C. 154(b) by 166 days.

(21) Appl. No.: 15/501,898

(22) PCT Filed: Aug. 20, 2014

(86) PCT No.: PCT/JP2014/071758
§ 371 (c)(1),
(2) Date: Feb. 6, 2017

(87) PCT Pub. No.: WO2016/027325
PCT Pub. Date: Feb. 25, 2016

(65) Prior Publication Data
US 2017/0225285 A1 Aug. 10, 2017

(51) Int. Cl.
*B23Q 3/157* (2006.01)
*B23Q 1/01* (2006.01)
(Continued)

(52) U.S. Cl.
CPC .............. *B23Q 41/04* (2013.01); *B23C 1/002* (2013.01); *B23C 1/14* (2013.01); *B23P 23/00* (2013.01);
(Continued)

(58) Field of Classification Search
CPC .... B23Q 37/00; B23Q 37/005; B23Q 37/007; B23Q 37/002; B23Q 39/04;
(Continued)

(56) References Cited

U.S. PATENT DOCUMENTS 4,762,218 A * 8/1988 Sticht ................... B23Q 7/1468
104/38
6,626,285 B2 * 9/2003 Enomoto ........... B23Q 11/0057
198/581
(Continued)

FOREIGN PATENT DOCUMENTS

DE 102012107627 A1 * 2/2014
DE 102016007407 A1 * 12/2017
(Continued)

OTHER PUBLICATIONS

Machine Translation of DE 102012107627 A1, which DE '627 was published Feb. 2014.*
(Continued)

*Primary Examiner* — Erica E Cadugan
(74) *Attorney, Agent, or Firm* — Oblon, McClelland, Maier & Neustadt, L.L.P.

(57) ABSTRACT

A machining system including a base; multiple work modules arranged in an arrangement direction on the base, at least one of the multiple work modules being a processing module, which processes a work with a tool, provided with a main shaft head including a main shaft on which a tool is attached and a main shaft rotating device that rotates the main shaft; a head raising and lowering device that moves the main shaft head in a vertical direction; a head moving device that moves the main shaft head in a horizontal plane by moving it in two perpendicular directions; and a work table that holds a work; the processing module being configured so as to be pulled from the base along a path extending in an intersecting direction, which is a direction perpendicular to the arrangement direction.

8 Claims, 10 Drawing Sheets

(51) Int. Cl.
- *B23Q 1/62* (2006.01)
- *B23Q 1/52* (2006.01)
- *B23Q 7/14* (2006.01)
- *B23Q 11/08* (2006.01)
- *B23Q 11/00* (2006.01)
- *B23Q 37/00* (2006.01)
- *B23Q 41/04* (2006.01)
- *B23C 1/14* (2006.01)
- *B23P 23/02* (2006.01)
- *B23C 1/00* (2006.01)
- *B23P 23/00* (2006.01)
- *B23Q 1/00* (2006.01)
- *B23Q 41/00* (2006.01)
- *B23Q 11/02* (2006.01)
- *B23C 1/06* (2006.01)
- *B23Q 39/04* (2006.01)
- *B23Q 3/155* (2006.01)

(52) U.S. Cl.
CPC .............. *B23P 23/02* (2013.01); *B23Q 1/00* (2013.01); *B23Q 1/626* (2013.01); *B23Q 3/15706* (2013.01); *B23Q 11/0057* (2013.01); *B23Q 11/0067* (2013.01); *B23Q 37/00* (2013.01); *B23Q 37/007* (2013.01); *B23Q 41/00* (2013.01); *B23C 1/06* (2013.01); *B23Q 1/525* (2013.01); *B23Q 3/15533* (2013.01); *B23Q 7/1415* (2013.01); *B23Q 11/08* (2013.01); *B23Q 39/048* (2013.01); *B23Q 2003/15537* (2016.11); *Y10T 29/50* (2015.01); *Y10T 29/5124* (2015.01); *Y10T 29/5196* (2015.01); *Y10T 409/304088* (2015.01); *Y10T 409/305824* (2015.01); *Y10T 409/308288* (2015.01); *Y10T 483/115* (2015.01); *Y10T 483/165* (2015.01); *Y10T 483/1795* (2015.01)

(58) Field of Classification Search
CPC ....... B23Q 7/14–7/1494; B23Q 39/048; Y10T 29/50; Y10T 29/5124; Y10T 29/5196
USPC .......................................... 29/560, 563, 33 P
See application file for complete search history.

(56) References Cited

U.S. PATENT DOCUMENTS

| | | |
|---|---|---|
| 2006/0104751 A1 | 5/2006 | Arai |
| 2008/0187406 A1 | 8/2008 | Kai |
| 2009/0012642 A1 | 1/2009 | Mertens et al. |
| 2009/0151148 A1* | 6/2009 | Reinisch ............... B23P 21/004 29/564.1 |
| 2016/0214227 A1* | 7/2016 | Nagato .................. B23Q 39/04 |

FOREIGN PATENT DOCUMENTS

| | | |
|---|---|---|
| FR | 2 892 040 A1 | 4/2007 |
| JP | 2006-68894 A | 3/2006 |
| JP | 2006-255859 A | 9/2006 |
| WO | 2013/081092 A1 | 6/2013 |

OTHER PUBLICATIONS

International Search Report dated Nov. 18, 2014 in PCT/JP2014/071758 filed Aug. 20, 2014.

* cited by examiner

MACHINING SYSTEM

TECHNICAL FIELD

The present application relates to a machining system in which multiple working machines including a machine tool are disposed.

BACKGROUND ART

Disclosed in patent literature 1 below is a machine tool that processes work with a tool, the machine tool being provided with (A) a main shaft head including a main shaft on which a tool is attached and a main shaft rotating device that rotates the main shaft; (B) a head raising and lowering device that moves the main shaft head in a vertical direction; (C) a head moving device that moves the main shaft head in a horizontal plane by moving it in two perpendicular directions; and (D) a work table that holds a work.

CITATION LIST

Patent Literature

PTL 1: JP-A-2006-255859

SUMMARY

The above machine tool, or so-called vertical machining center, may be arranged in a production line. It may be necessary to approach such a machining center arranged in such a production line from the side, for example, when performing maintenance, thus it is necessary to maintain sufficient space at the side of the machine, leading to a problem in that this increases the length of the production line. It is desirable to improve the practicality of a machining system in which multiple machines including a vertical machining center are arranged by providing a countermeasure to this problem. The present disclosure takes account of the above circumstances and an object thereof is to provide a highly practical machining system.

To solve the above problems, the present disclosure of a machining system includes: a base; multiple work modules arranged in an arrangement direction on the base, at least one of the multiple work modules being a processing module, which processes a work with a tool, provided with (A) a main shaft head including a main shaft on which a tool is attached and a main shaft rotating device that rotates the main shaft; (B) a head raising and lowering device that moves the main shaft head in a vertical direction; (C) a head moving device that moves the main shaft head in a horizontal plane by moving it in two perpendicular directions; and (D) a work table that holds a work; the processing module being configured so as to be capable of being pulled from the base along a path extending in an intersecting direction, which is a direction perpendicular to the arrangement direction.

Effects

According to the present disclosure of a machining system, because it is possible to pull out the processing module, the processing module can be pulled out to perform maintenance or the like, thus there is no need to maintain space at the side surface of the module, that is, in the arrangement direction, meaning that the overall length of the machining system can be made shorter in the arrangement direction.

DESCRIPTION OF EMBODIMENTS

Hereinafter embodiments of the present disclosure of a machining system are described with reference to the drawings. Note that, in addition to the following embodiments, the present disclosure can be embodied with various modifications based on knowledge of those skilled in the art.

Configuration of Machining System of Present Disclosure

Figure 1:
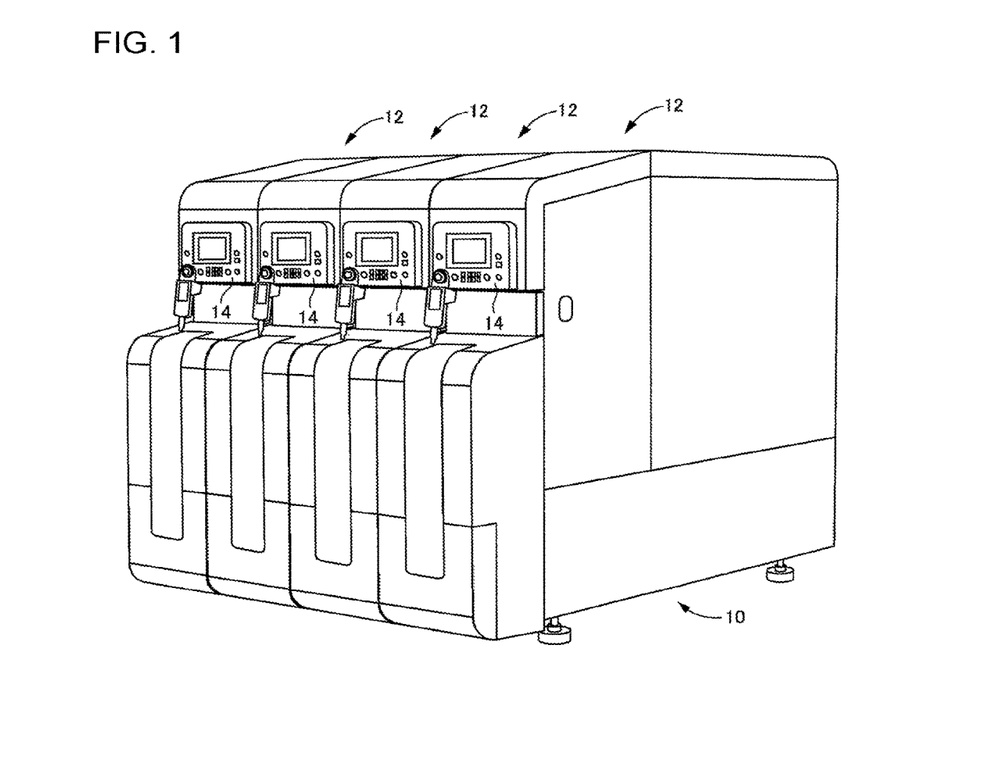
FIG. 1 is a perspective view showing an embodiment of the present disclosure, a machining system, from the front right of the system.
Figure 2:
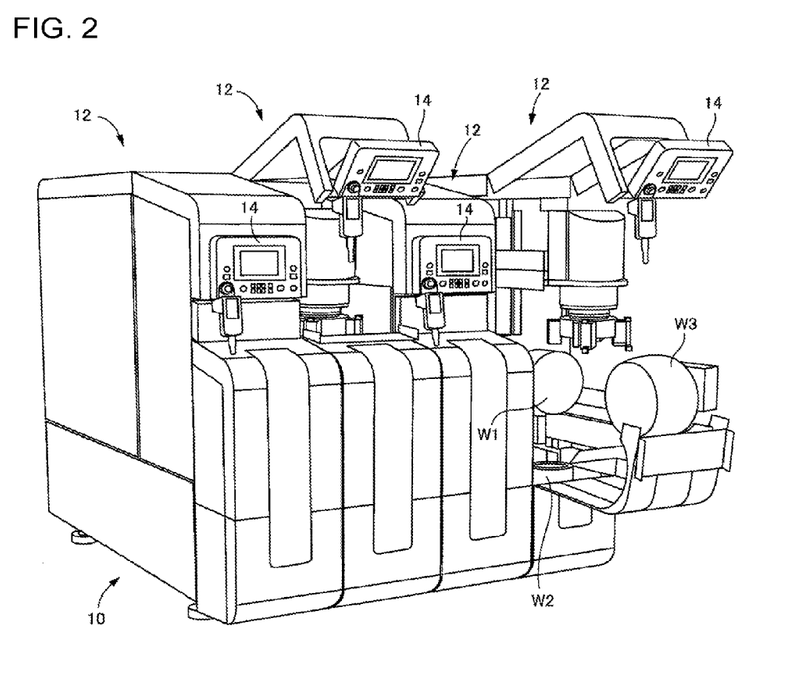
FIG. 2 is a perspective view showing the machining system of FIG. 1 viewed from the left front side, in a state in which some of the external panels are open.
Figure 3:
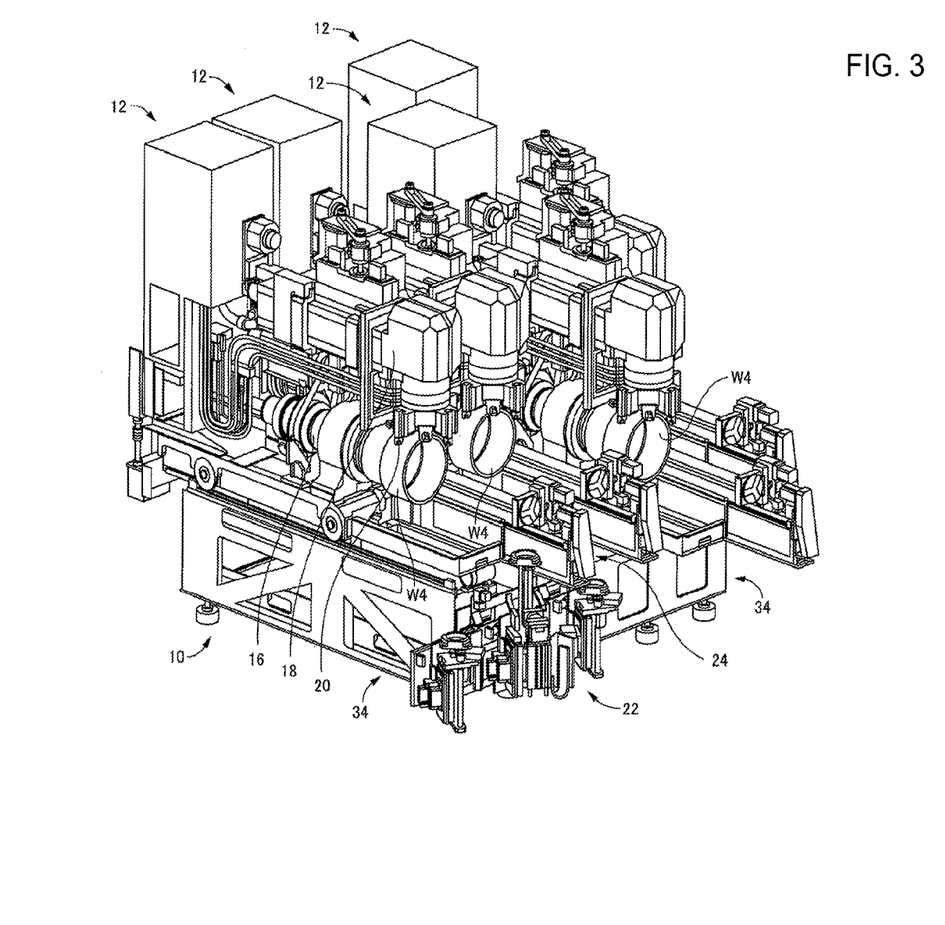
FIG. 3 is a perspective view showing the machining system of FIG. 1 viewed from the left front side, in a state with the external panels removed.

First, before describing a machining system that is an embodiment of the present disclosure, a machining system related to the present embodiment of a machining system is described (this is also sometimes referred to as a "related system"). The related system, as shown in FIGS. 1 to 3, is configured from items including base 10, and four work modules (also referred to as "modules") 12 arranged on base 10. FIG. 1 shows a system with the external panels attached, FIG. 2 shows the system with some of the external panels open, and FIG. 3 shows the system with the external panels removed. Note that, in the following descriptions, the side at which operation panel 14 is provided is referred to as the front side, and the "front and rear", "left and right", and "up and down" sides of the system are respectively the front and rear, left and right, and up and down when looking at the system from the front side. That is, the left and right direction in which the four modules 12 are arranged is the arrangement direction, and the front and rear direction is the intersecting direction, which is the direction perpendicular to (intersecting) the arrangement direction.

Each of the four work modules shown in FIGS. 1 to 3 is a lathe module, which is a modularized lathe, that performs cutting processing on work W4 (refer to FIG. 3) positioned at a work position using bite 20 held on head 18 by work W4 being rotated by spindle 16. With this related system, the work is transferred between each module 12 by work transporting device 22. At each module 12, work transported by work transport device 22 is attached to a chuck, which is a holding tool attached to the tip of spindle 16 by work moving device 24. Also, work for which processing by module 12 is complete is transferred from the chuck to work transporting device 22 by work moving device 24, and is transported to the next module 12 by work transporting device 22.

Figure 4:
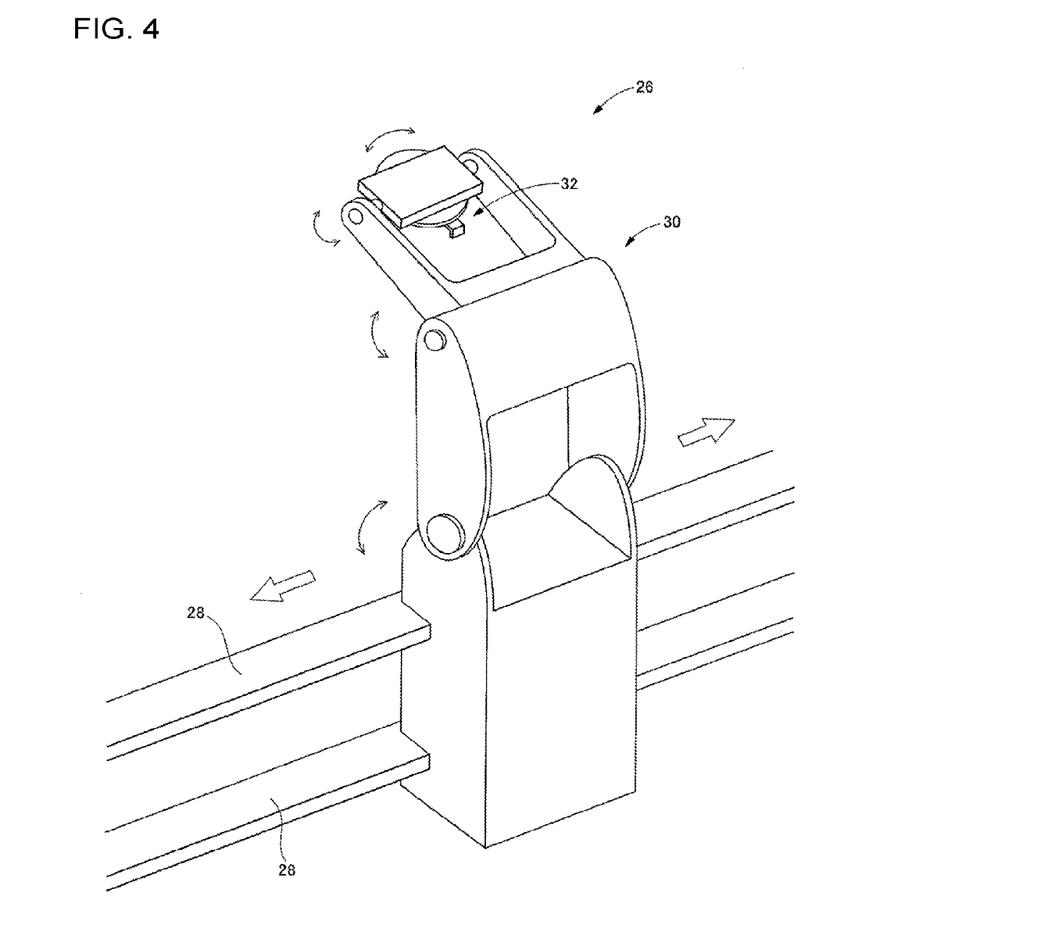
FIG. 4 is a perspective view showing a device for transporting work that is applicable to the system shown in FIG. 1.

Also, in the related system, instead of the above work transporting device 22 and work moving device 24, it is possible to use a work transporting attachment and detachment device 26 that is capable of performing both sets of work. This work transporting attachment and detachment device 26, as shown in FIG. 4, is movable in the arrangement direction along pair of rails 28 attached to the front surface of base 10, such that work is able to be transported along multiple modules 12. Also, work transporting attachment and detachment device 26 includes articulated arm 30, and chuck 32 provided at the leading end of arm 30 as a holding tool for holding work. That is, work transporting attachment and detachment device 26 extends arm 30 to the processing position of module 12, receives work from the processing position and attaches work at the processing position using chuck 32.

Note that, in FIGS. 2 and 3, the work and some configuration elements are omitted or show schematically. W1 of FIG. 2 and W4 of FIG. 3 schematically represent work positioned at a set work position, W2 of FIG. 2 schematically represents work transferred across modules 12 by the transporting device, and W3 schematically represents the occupied space range of work while being moved to the work position inside each module 12.

As understood from FIGS. 1 to 3, the four modules 12 have substantially the same shape, dimension, and structure and are closely arranged at a set arrangement pitch in the arrangement direction. The gap between each module 12 is 50 mm or less, and in actuality the four modules 12 are arranged with practically no gap between them. Each of the modules 12 has a general shape of a rectangular parallelepiped and the dimension in the right-left direction (hereinafter, sometimes referred to as "module width") is significantly smaller than the dimension in the front-rear direction (hereinafter, sometimes referred to as "module length"). Also, base 10 has substantially the same left-right dimension as the overall left-right dimension of four modules when the four modules are loaded on the base. That is, base 10 is just large enough in the left-right direction for four modules 12 to be loaded.

Figure 5:
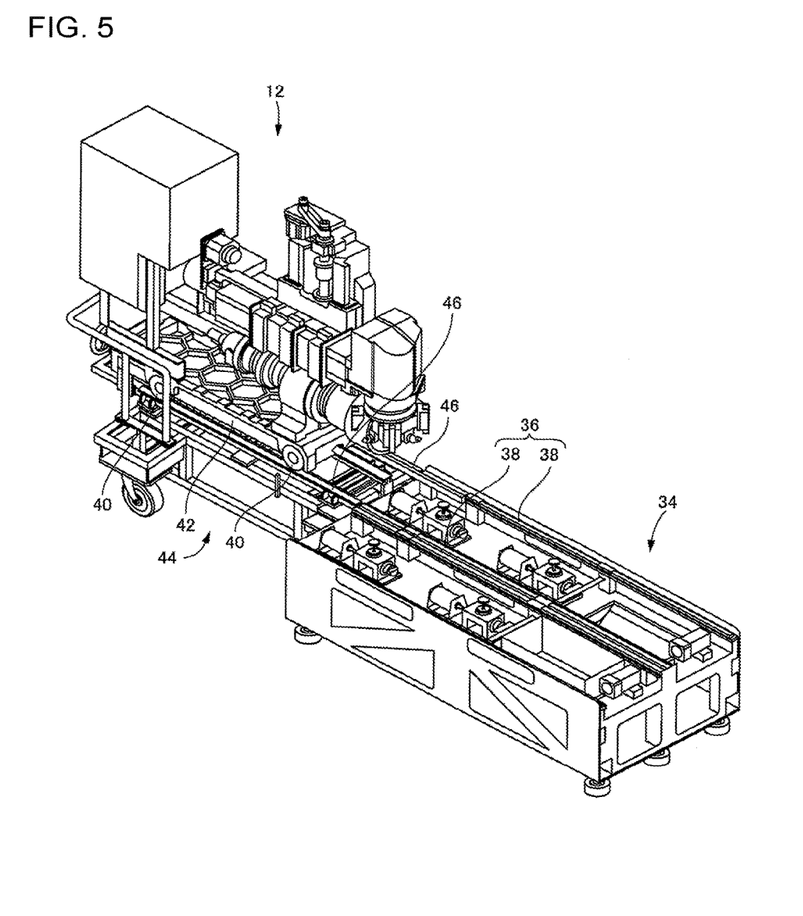
FIG. 5 is a perspective view showing a work module of FIG. 3 pulled from the base in the rearwards direction.

Base 10 is configured from items including two base units 34 lined and affixed to each other. As shown in FIG. 5, two modules 12 are able to be loaded on each base unit 34. Each of the two base units 34 is standardized and both base units have the same shape, dimension, and structure.

As shown in FIG. 5, a quantity of rail pairs 36 corresponding to the quantity of modules 12 mounted on each base unit 34, that is, specifically, two rail pairs 36, are provided parallel to the arrangement direction. One rail pair 36 has a pair of rails 38 laid out at an interval extending in the intersecting direction (front-rear direction). Rails 38 mark the path along which module 12 moves when module 12 is pulled out. In the respective modules 12, a pair of wheels 40 at each of the front and rear, that is, two pairs of wheels 40, are rotatably held in bed 42. Module 12 is easily pulled out from base unit 34 in both directions, that is, in the frontwards direction or the rearwards direction, by the two pairs of wheels 40 rotating on the pair of rails 38. Note that, in FIG. 2 the module 12 further to the right is pulled forward in the intersecting direction, and in FIG. 3 the second module 12 from the right is pulled forward in the intersecting direction.

Further, modules 12 are able to be pulled all the way off base unit 34. Pulling out of modules 12 is shown in FIG. 5, which shows a module being pulled out from the rearwards direction using trolley 44. Trolley 44 includes pair of rails 46 with the same cross section and gap between them as pair of rails 36 provided on base unit 34; the pair of rails 46 are set against base 10 so as to extend the pair of rails 38. In that state, a portion or all of module 12 is able to be moved onto trolley 44.

Configuration of Embodiment of Machining System

Figure 6:
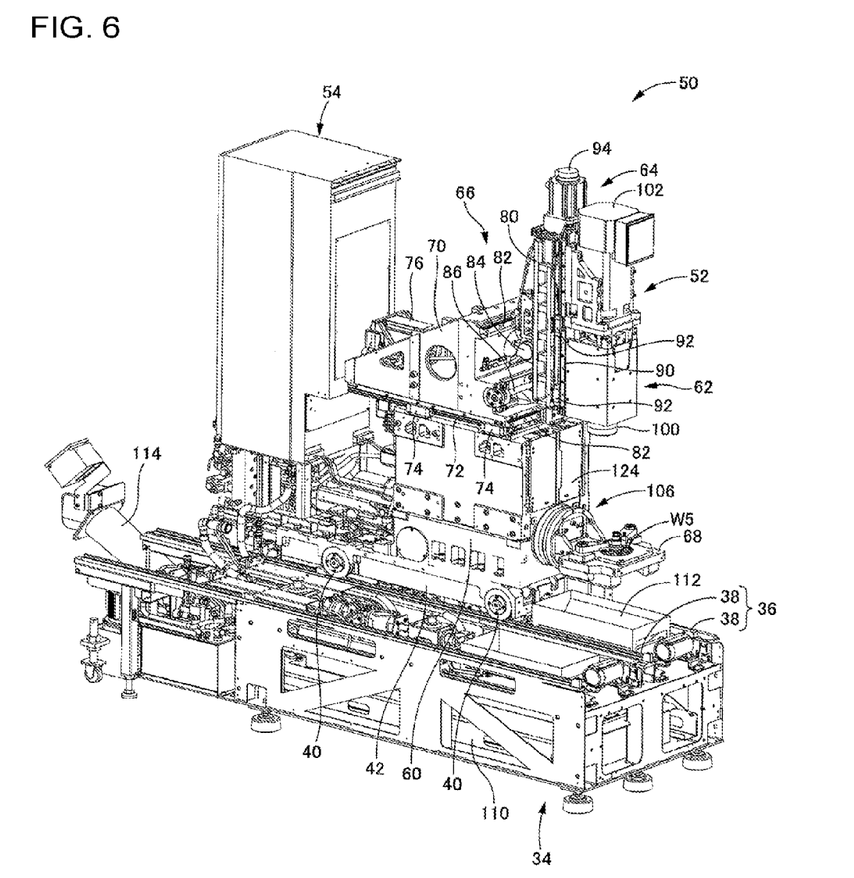
FIG. 6 is a perspective view showing an embodiment of the present disclosure, that is, a processing module that configures the machining system, from the front left.
Figure 7:
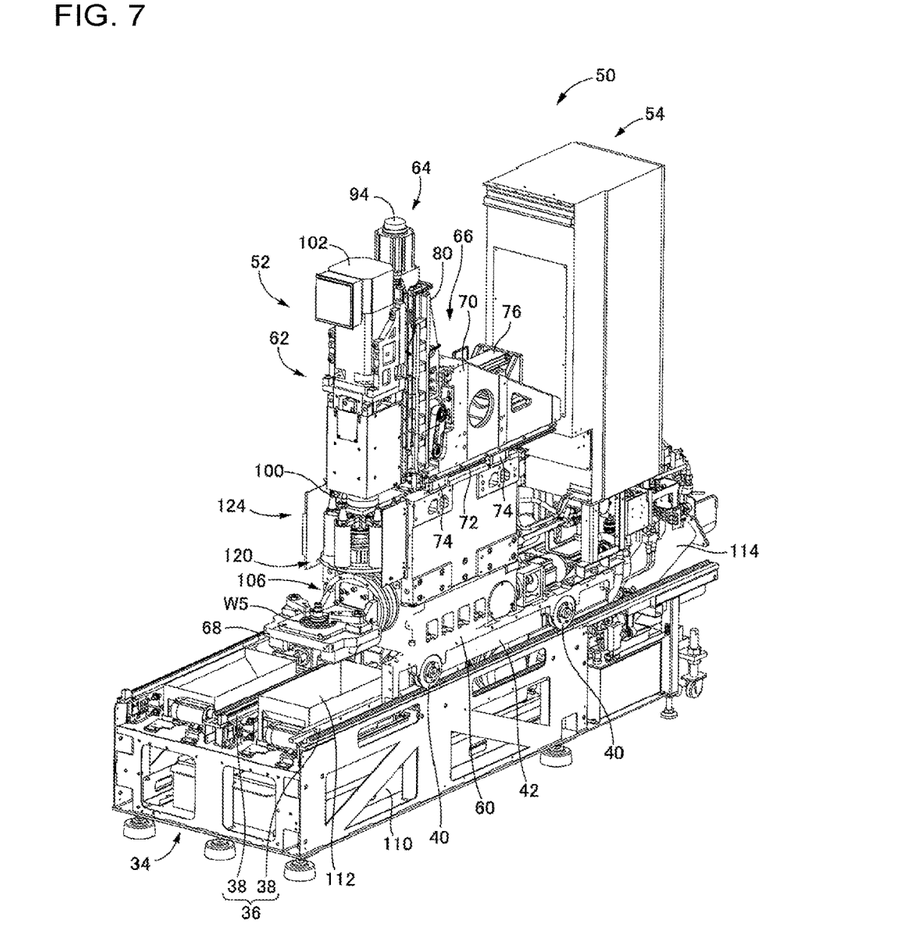
FIG. 7 is a perspective view showing an embodiment of the present disclosure, that is, a processing module that configures the machining system, from the front right.

As described above, with the above related system, each lathe module 12 is able to be removed from and loaded on base 10, such that exchange with another work module is possible, such as different work module 50 shown in FIGS. 6 and 7. Work module 50 is a modularized machining center, and as described later in detail, performs cutting processing on work W5 fixedly held on a work table using a drill or endmill. In the descriptions below, work module 50 is sometimes referred to as drilling mill module 50. Also, the machining system of the present embodiment of the present disclosure is a system in which at least one of the four lathe modules 12 of the connected system shown in FIGS. 1 to 3 is exchanged for drilling mill module 50.

Drilling mill module 50 as a processing module uses the same bed 42 as the above lathe module 12, and has the same module width. That is, similar to lathe module 12, drilling mill module 50 has a module width significantly smaller than the dimension in the front-rear direction. Described below in detail is the configuration of drilling mill module 50 with a small module width as above, and the configuration of the machining system of the present embodiment.

As shown in FIGS. 6 and 7, drilling mill module 50 is provided with bed 42 that rotatably holds multiple wheels 40, machining center 52 that is set on bed 42 and that performs processing work, and control box 54 that controls machining center 52. Machining center 52 is a so-called vertical machining center, and is provided with module main body 60 fixed on bed 42, main shaft head 62 the lower end of which holds a tool, head raising and lowering device 64 that moves main shaft head 62 in a vertical direction, head moving device 66 that moves main shaft head 62 in a horizontal plane by moving it in two perpendicular directions, and work table 68 that holds work W5.

An upper section of module main body 60 supports head moving device 66 and head raising and lowering device 64. First slider 70 is supported on the upper section of module main body 60 so as to be slidable in the front-rear directions using pair of guide rails 72 provided on first slider 70 and multiple bearings 74 provided on module main body 60. First slider 70 is moved in the front and rear directions by a front and rear moving mechanism that includes a front and rear motor 76, a ball screw, and the like. Also, as a head holding body that holds main shaft head 62, second slider 80 is supported on first slider 70 so as to be slidable in left and right directions along pair of guide rails 82 provided on a front surface of first slider 70. Second slider 80 is moved in left and right directions by a left and right moving mechanism that includes a left and right motor 84, ball screw mechanism 86, and the like. That is, head moving device 66 is configured from items including first slider 70, pair of guide rails 72, bearings 74, a forwards and backwards moving mechanism, second slider 80, pair of guide rails 82, and a left and right moving mechanism.

Main shaft head 62 is supported on second slider 80 so as to be slidable in up and down directions by pair of guide rails 90 provided on main shaft head 62 and multiple bearings provided on second slider 80. Note that, raising and lowering device 64 has main configuration elements such as head raising and lowering motor 94 and a ball screw mechanism, and main shaft head 62 is moved in a vertical direction by head raising and lowering device 64.

Main shaft head 62 is supported at a position further forward than the front surface of module main body 60 by a configuration of the above head moving device 66 and head raising and lowering device 64. Main shaft head 62 includes a main shaft rotating device configured from a main body of main shaft 100 that extends vertically and the lower end of which holds a tool such as a drill or endmill, and main shaft rotating motor 102 that rotates main shaft 100 about its own axis.

Work table 68 is supported in a state extending from the front surface to the rear surface of module main body 60. Machining center 52 is provided with table rotating device 106 that rotates work table 68 around an axis line that extends in the front-rear direction, and is capable of performing processing using a tool on work W5 held at an angle. Note that, the table rotating device may rotate the work table about an axis extending in a direction other than the front-rear direction, such as a left-right direction, or a direction between the front-rear direction and left-right direction wherein rotation occurs around an axis line that extends in a horizontal direction. In other words, the table rotating mechanism may perform rotation around a vertical axis, or around both a horizontal axis and a vertical axis.

Note that, in the machining system of the present embodiment, work is moved from an adjacent module to work table 68 by work transporting attachment and detachment device 26 that includes the articulated arm 30 shown in FIG. 4, and work for which processing by drilling mill module 50 is complete is moved from work table 68 to the next module.

Drilling mill module 50, when performing cutting processing on work, performs cutting processing while applying coolant to the work. Also, shavings are generated during the cutting processing. The present machining system is configured to take account of this coolant and shavings. Specifically, as shown in FIGS. 6 and 7, coolant tank 110 that stores coolant is built into base unit 34. And, entrance 112 for coolant and shavings to enter coolant tank 110 is provided on an upper surface of the front side of base unit 34 so as to be positioned below work table 68 provided in a forwards direction of module main body 60. Whilst omitting detailed descriptions, coolant tank 110 is provided with an internal screw conveyor such that coolant and shavings are separated and only the shavings are fed to the rear side of coolant tank 110. Coolant tank 110 protrudes from the rear side of base unit 34, and discharge duct 114 of the screw conveyor is provided on that protruding rear end section. That is, shavings that are generated at the position to the front side of module 50 are fed to the rear side by the screw conveyor provided inside coolant tank 110, past discharge duct 114, and discharged from the rear of this system. Note that, the shavings discharge device that discharges shavings received by base 10 from the rear of base 10 includes items such as coolant tank 110 and the screw conveyor.

Also, machining center 52 includes tool magazine 120 that stores multiple tools that attach to main shaft 100, and one of the multiple tools stored in tool magazine 120 is configured to be automatically exchangeable with a tool attached to main shaft 100. Tool magazine 120 is stored inside module main body 60, and as shown in FIG. 7, during tool exchange, protrudes from the opening provided on the front surface of module main body 60. Note that, as shown in FIG. 6, during processing work by drilling mill module 50, that opening is covered by cover 124, such that coolant and shavings and the like are prevented from entering inside module main body 60 and getting on items such as tools stored in tool magazine 120.

Figure 8A:
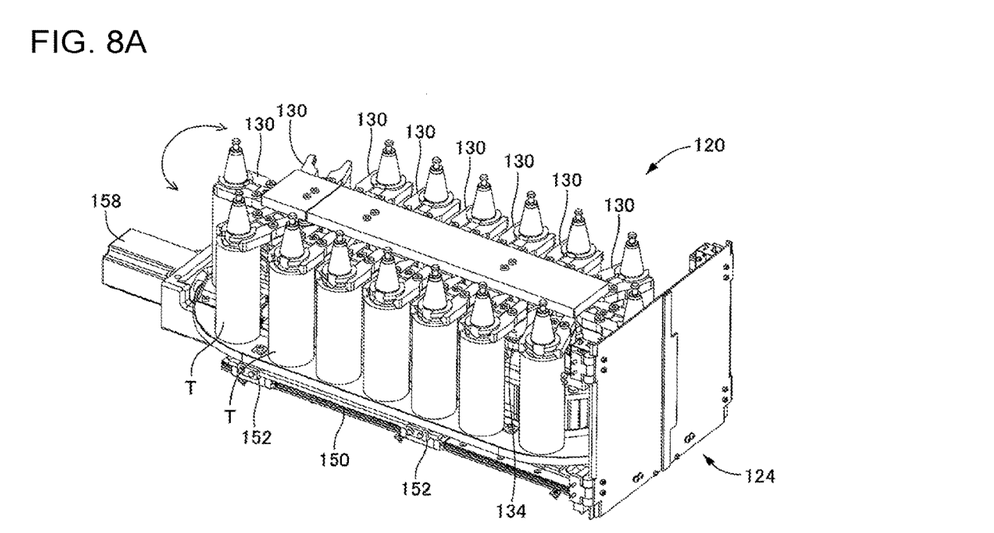
FIG. 8 is a perspective view of a tool magazine provided in the processing module shown in FIG. 6.
Figure 8B:
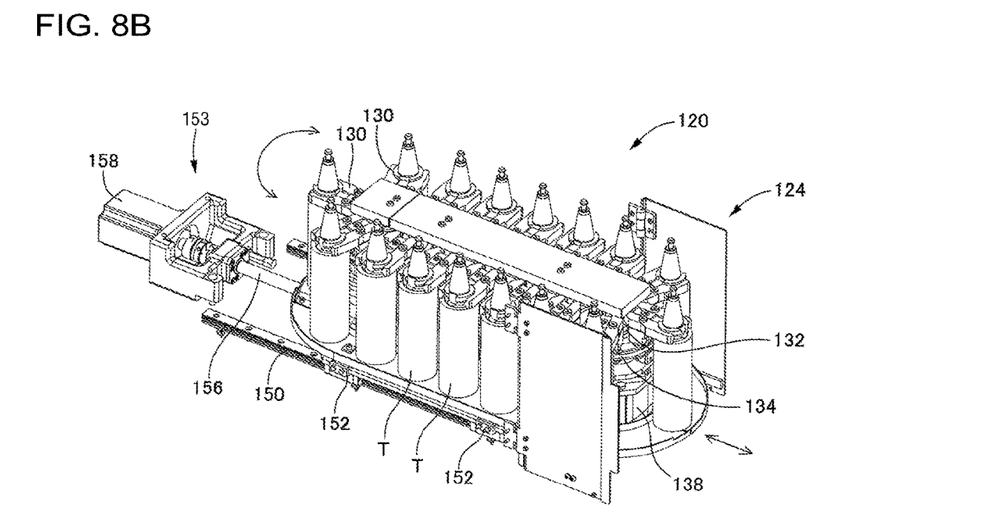

As shown in FIG. 8, tool magazine 120 includes multiple tool holders (hereinafter, also sometimes referred to simply as "holders") 130 that each hold a tool in an orientation extending in the vertical direction. That is, tool magazine 120 houses multiple tools such that the axis lines of each are parallel. Note that, as shown in FIG. 8A, usually, one or more holders 130 does not hold a tool, such that a holder is empty for receiving a tool attached to main shaft 100. T in FIG. 8 schematically represents the empty storage range for tools held in each holder 130.

The above multiple tool holders 130 are arranged on an elongated oval that is long in the front-rear direction (intersecting direction). Specifically, tool magazine 120 includes roller chain 134 provided on two sprockets 132, and by the multiple tool holders 130 being fixed to roller chain 134, each of the multiple roller chains 134 is arranged along the elongated oval that is long in the intersecting direction. That is, tool magazine 120 has a small dimension in the left-right direction (arrangement direction) because the multiple tool holders are arranged along an elongated oval.

Tool magazine 120 includes a sprocket drive motor for rotating sprockets 132 forwards (the right side in the figures), and reduction device 138 that transmits the rotation of the sprocket rotating motor to sprocket 132. Tool magazine 120, by rotating sprockets 132 using the sprocket rotating motor, is able to rotate roller chain 134 such that the multiple tool holders 130 are circulated. That is, the tool holder circulating mechanism is configured from items including the two sprockets 132, roller chain 134, a sprocket rotating motor, and reduction device 138.

Also, tool magazine 120 is able to move in the front and rear directions due to pair of guide rails 150 fixed inside module main body 60 extending in the front-rear direction, and bearings 152 as an guide engaging section fixed to the guide. Further, machining center 52 is provided with magazine moving device 153 that moves tool magazine 120 in front and rear directions. Magazine moving device 153 is configured from items including a ball screw mechanism, and magazine moving motor 158 that rotates ball screw 156 of the ball screw mechanism. The nut of the ball screw mechanism is fixed to the bottom surface of tool magazine 120, and by rotating ball screw 156 using magazine rotating motor 158 fixed to module main body 60, the entire tool magazine 120 is able to be moved in the front and rear directions.

Machining center 52 advances tool magazine 120 using magazine moving device 153, and the front end of tool magazine 120 protrudes from an opening in module main body 60. Then, in a state with tool magazine 120 positioned at the front limit a tool holder 130 used for exchange of the multiple tool holders 130, that is, the tool holder 130 positioned at the front limit, is positioned within the range in which main shaft 100 can be moved by head moving device 66, and tool shaft 100 tool exchange is performed with respect to the holder 130 positioned at the front limit.

To describe tool exchange in more detail: first, tool magazine 120 is advanced by magazine moving device 153, and main shaft 100 is moved to the exchange position by head moving device 66. Note that, at tool magazine 120, a holder 130 not holding a tool is positioned at the front limit. Holder 130 is configured to grasp with two claws, and main shaft 100 is moved to the rear, the tool attached to main shaft 100 is engaged by the gap between the two claws of holder 130, and that tool is grasped by the holder 130. Then, main shaft 100 is raised such that the tool is separated from main shaft 100. Continuing, tool holders 130 are circulated and a tool to be attached to main shaft 100 is positioned at the front limit of tool magazine 120. Next, main shaft 100 is lowered and the tool is attached to main shaft 100. Continuing, main shaft 100 is moved forwards, and by retracting tool magazine 120, the tool is released from holder 130, thus completing tool exchange.

Figure 9:
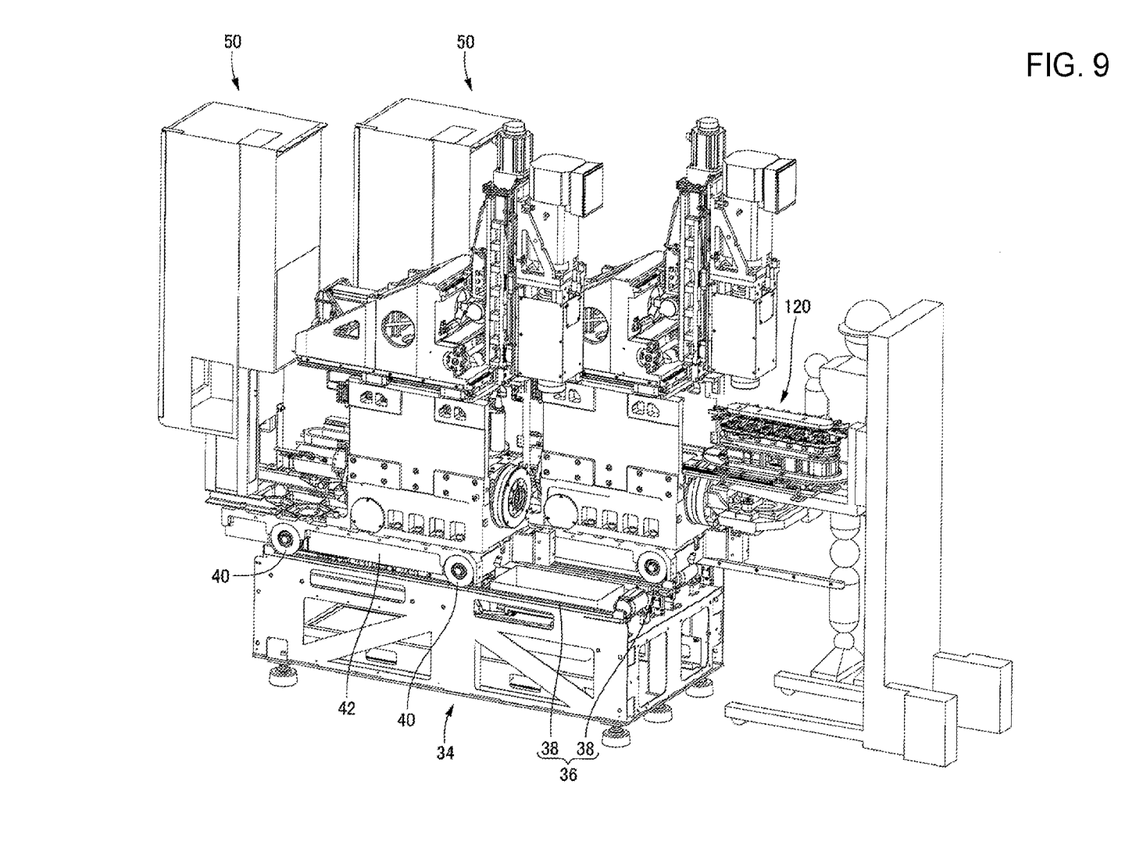
FIG. 9 is a perspective view showing the processing module of FIG. 6 pulled forward on the base.
Figure 10:
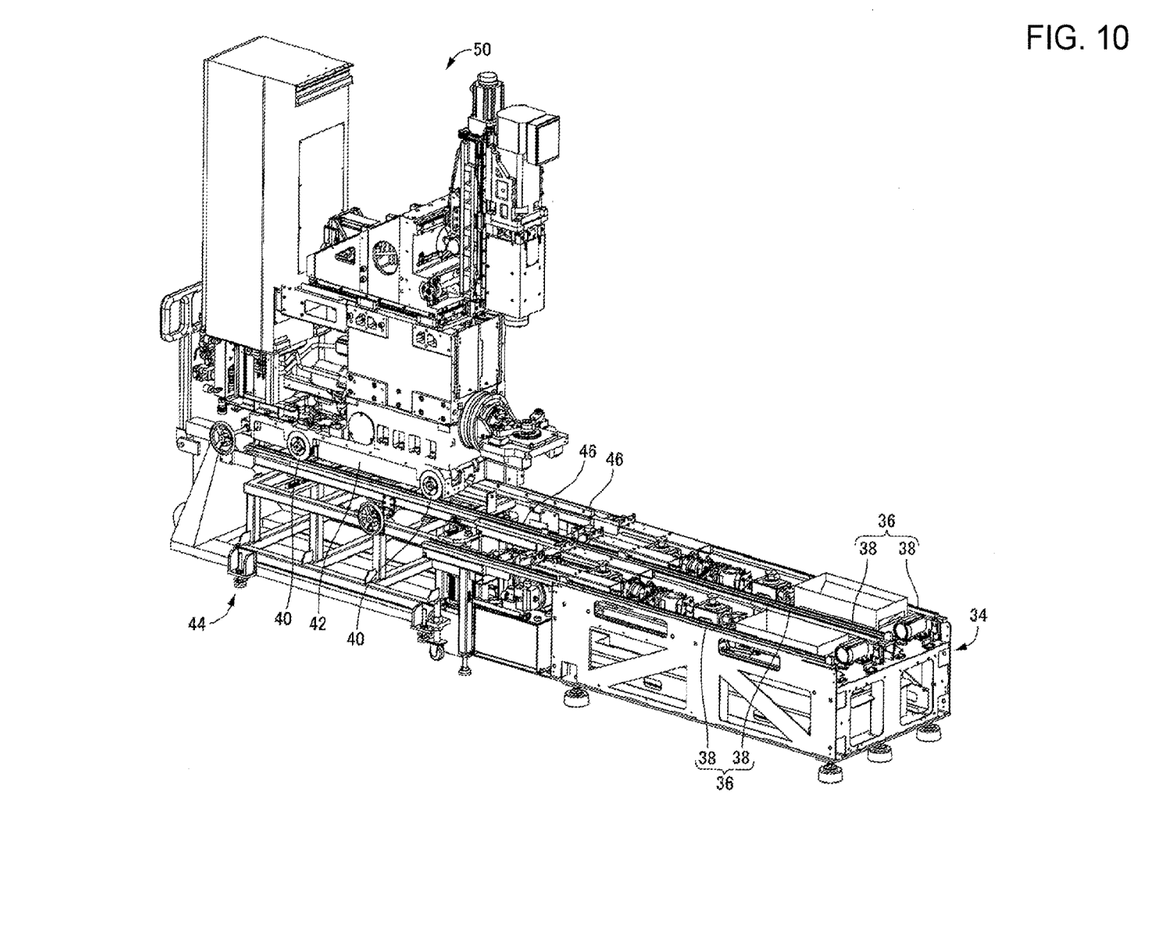
FIG. 10 is a perspective view showing the processing module of FIG. 6 pulled backwards from the base.

Because the above drilling mill module 50, as described, uses bed 42 similar to that of lathe module 12, in a similar manner to lathe module 12, drilling mill module 50 can be pulled out from base 10 along a path extending in the intersecting direction (front-rear direction). In FIG. 9, the drilling mill module 50 on the right is shown pulled out forwards. Also, the pulling forward of drilling mill module 50 to the front as shown in FIG. 9 is performed for maintenance of tool magazine 120, exchange of tool magazine 120 according to a work change, and the like. On the other hand, in FIG. 10, drilling mill module 50 is shown pulled out all the way off. By arranging in this state, overall maintenance of machining center 52 becomes easy to perform.

With this machining system, even though multiple modules including drilling mill module 50 are arranged closely adjacent to each other, work such as maintenance, changeover, and exchange for each module can be performed easily. In other words, in contrast to a conventional machining center, it is not necessary to provided space at the side for maintenance and the like, thus it is possible to arrange another module closely adjacent to drilling mill module 50. Therefore, the machining system can be made shorter in the arrangement direction.

Because tool magazine 120 is housed inside module main body 60, this machining system is more compact compared to a case in which tool magazine 120 is arranged outside of module main body 60. However, because tool magazine 120 is housed inside module main body 60, approaching tool magazine 120 is more difficult. But, as described above, with this machining system, because module 50 can be pulled out from base 10, it is easy to approach tool magazine 120.

Also, with this machining system, as described above, tool magazine 120 has tool holders 130 arranged along an elongated oval that is long in the intersecting direction (front-rear direction). Thus, the direction of tool magazine 120 in the arrangement direction is relatively small, meaning the width of drilling mill module 50 in the arrangement direction is small. Further, this machining system is configured such that, when exchanging a tool attached to main shaft 100, tool magazine is moved by magazine moving device 153 to a range in which tool shaft 100 can be moved. Thus, there is no need to widen the moving range of main shaft 100 for tool exchange, meaning that drilling mill module 50 can be compact.

Even further, with this machining system, shavings are discharged by a shavings discharge device to the rear of the system. Due to this, there is no need to provide a box for collecting shavings in the arrangement direction, so the length of the system is shorter than a system provided with such a box.

REFERENCE SIGNS LIST

10: base; 12: work module (lathe module); 26: work transporting attachment and detachment device; 34: base unit; 36: pair of rails; 38: rail; 40: wheel; 42: bed; 44: trolley; 46: rail; 50: drilling mill module (processing module); 52: machining center; 60: module main body; 62: main shaft head; 64: head raising and lowering device; 66: head moving device; 68: work table; 70: first slider; 76: front and rear motor; 80: second slider; 84: left and right moving motor; 94: head raising and lowering motor; 100: main shaft; 102: main shaft rotating motor; 106: table rotating device; 110: coolant tank; 112: entrance; 114: discharge duct; 120: tool magazine; 124: cover; 130: tool holder; 132: sprocket; 134: roller chain; 150: guide rail; 152: bearing (guide engaging section); 153: magazine moving device; 156: ball screw; 158: magazine moving motor

The invention claimed is:

1. A machining system comprising:
    a base;
    multiple work modules that are each arranged on the base on a common arrangement axis extending in an arrangement direction, at least one of the multiple work modules being a processing module, which processes a work with a tool, the processing module provided with:
    (A) a main shaft head including a main shaft on which a tool is attached and also including a main shaft rotating device that rotates the main shaft;
    (B) a head raising and lowering device that moves the main shaft head in a vertical direction;
    (C) a head moving device that moves the main shaft head in a horizontal plane by moving it in two perpendicular directions; and
    (D) a work table that holds a work;
    the processing module having opposite front and rear portions that are spaced along an intersecting direction, which is a direction that is perpendicular to the arrangement direction, the work table being located on the front portion, the processing module being configured so as to be capable of being pulled frontward on the base along a path extending in the intersecting direction, and the processing module being configured to be pulled rearward on and from the base along the path extending in the intersecting direction to remove the processing module from the base.

2. The machining system according to claim 1, wherein the processing module includes a tool magazine in which multiple tools to be attached to the main shaft are stored, and is configured to automatically exchange the tool attached to the main shaft with one of the multiple tools stored in the tool magazine,
    the tool magazine including multiple tool holders each configured to hold a respective tool and arranged along an elongated ellipse that is elongated in the intersecting direction, and the processing module also including a tool holder circulating mechanism configured to circulate the multiple tool holders.

3. The machining system according to claim 2, wherein the processing module includes
    a module main body, the head raising and lowering device being supported on an upper portion of the module main body, and the tool magazine being housed inside the module main body, and
    a magazine moving device that moves the tool magazine in the intersecting direction, and, when performing tool exchange, advances the tool magazine in the intersecting direction so as to protrude from a side surface of the module main body, and positions one of the multiple tool holders used for supplying a tool for exchange in a movement range in which the main shaft can by moved by the head moving device.

4. The machining system according to claim 1, wherein the multiple work modules are arranged on the base closely adjacent to each other in the arrangement direction.

5. The machining system according to claim 1, wherein each of the multiple work modules is capable of being drawn out from the base by being pulled rearward in the intersecting direction.

6. The machining system according to claim 1, wherein the processing module includes a pair of wheels, and the base includes a pair of rails provided extending in the intersecting direction,
the processing module being configured to be pulled from the base along the path by the pair of wheels of the processing module rotating along the pair of rails.

7. The machining system according to claim 1, wherein the processing module is provided with a table rotating device that rotates the work table around at least one of a vertical axis that extends in a vertical direction, or a horizontal axis that extends in a horizontal direction.

8. The machining system according to claim 1, wherein the base is configured to receive into the inside of the base shavings generated by processing of the work by the processing module, and the machining system includes a shavings discharge device configured to discharge from the rearward side of the base the shavings received by the base.

* * * * *

UNITED STATES PATENT AND TRADEMARK OFFICE
CERTIFICATE OF CORRECTION

PATENT NO. : 10,226,847 B2
APPLICATION NO. : 15/501898
DATED : March 12, 2019
INVENTOR(S) : Kazuya Asakawa et al.

It is certified that error appears in the above-identified patent and that said Letters Patent is hereby corrected as shown below:

On the Title Page

Item (71), the Applicant's information is incorrect. Item (71) should read:
-- (71) Applicant: FUJI CORPORATION, Chiryu (JP) --

Signed and Sealed this
Thirteenth Day of October, 2020

Andrei Iancu
*Director of the United States Patent and Trademark Office*